(12) United States Patent
Vimercati et al.

(10) Patent No.: US 7,911,290 B2
(45) Date of Patent: Mar. 22, 2011

(54) TRANSMISSION LINE SYSTEM FOR A DIGITAL SIGNAL HAVING A TRANSFER BUS SHIELDED FROM DISTURBANCES BY AT LEAST ONE CONDUCTIVE LINE

(75) Inventors: Daniele Vimercati, Carate Brianza (IT); Claudio Nava, Cornate d'Adda (IT); Christophe Laurent, Agrate Brianza (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 1076 days.

(21) Appl. No.: 11/560,704

(22) Filed: Nov. 16, 2006

(65) Prior Publication Data
US 2007/0133666 A1   Jun. 14, 2007

(30) Foreign Application Priority Data
Nov. 18, 2005   (EP) .................................. 05425816

(51) Int. Cl.
*H01P 5/02* (2006.01)

(52) U.S. Cl. .................. 333/24 C; 333/12; 333/24 R
(58) Field of Classification Search ............ 333/24 R, 333/24 C, 116, 128, 136, 12
See application file for complete search history.

(56) References Cited

U.S. PATENT DOCUMENTS

| | | | | |
|---|---|---|---|---|
| 3,619,504 A * | 11/1971 | De Veer et al. | ............... | 375/257 |
| 5,363,071 A * | 11/1994 | Schwent et al. | ............... | 333/111 |
| 5,625,328 A * | 4/1997 | Coleman, Jr. | ................ | 333/116 |
| 5,638,402 A * | 6/1997 | Osaka et al. | .................. | 375/257 |
| 6,133,621 A | 10/2000 | Gaibotti et al. | ............... | 257/659 |
| 6,449,308 B1 * | 9/2002 | Knight et al. | ................. | 375/212 |
| 2004/0212481 A1 | 10/2004 | Abraham | ............... | 340/310.01 |

FOREIGN PATENT DOCUMENTS

WO    98/40980    9/1998
WO    01/91437    11/2001

* cited by examiner

*Primary Examiner* — Benny Lee
(74) *Attorney, Agent, or Firm* — Lisa K. Jorgenson; Allen, Dyer, Doppelt, Milbrath & Gilchrist, P.A.

(57) ABSTRACT

A transmission system for a digital signal includes a transmitter and a receiver connected thereto by a transfer bus. The transmission system includes at least one conductive line capacitively coupled with the transfer bus.

26 Claims, 6 Drawing Sheets

TRANSMISSION LINE SYSTEM FOR A DIGITAL SIGNAL HAVING A TRANSFER BUS SHIELDED FROM DISTURBANCES BY AT LEAST ONE CONDUCTIVE LINE

FIELD OF THE INVENTION

The present invention relates to a transmission system for digital signals, with the transmission system comprising a transmitter and a receiver connected together by a transfer bus. More particularly, transmission of the digital signal from the transmitter to the receiver is driven by one or more drivers.

BACKGROUND OF THE INVENTION

Figure 1:
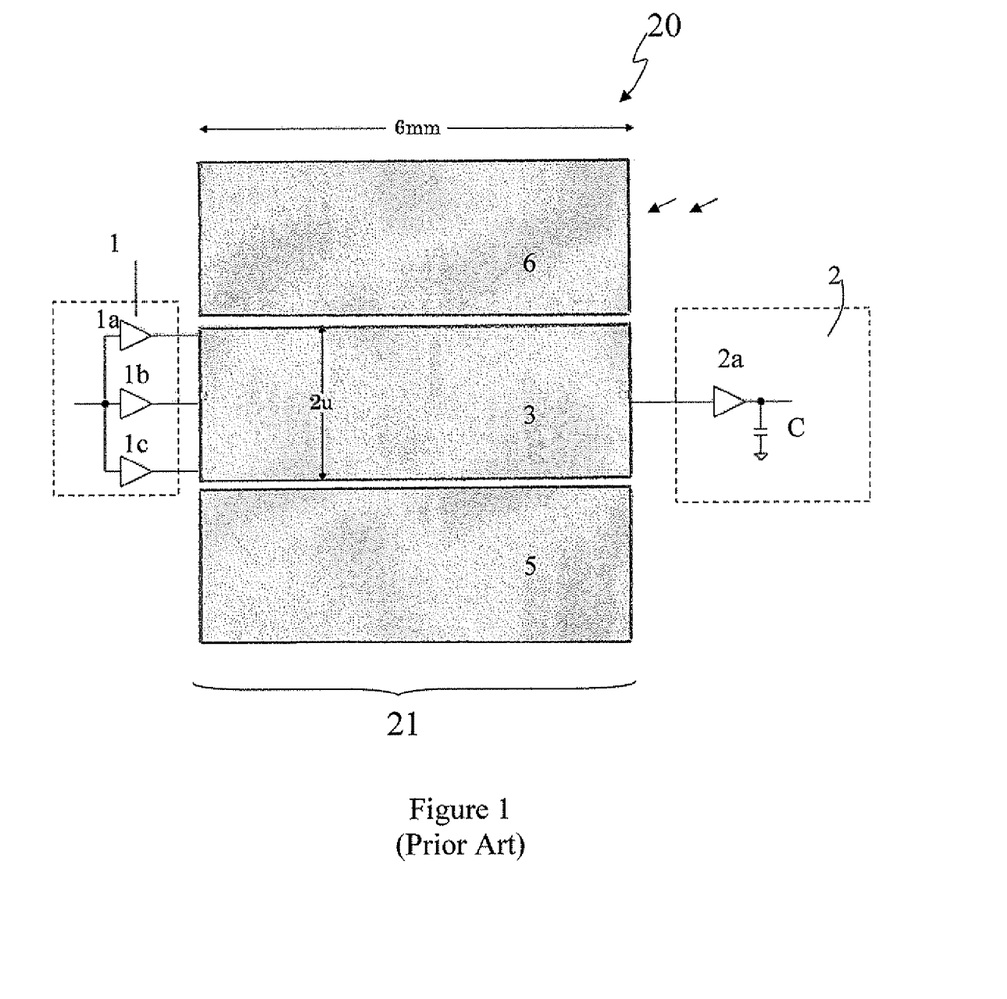
FIG. 1 schematically shows a transmission system for a digital signal comprising a transfer bus according to the prior art.

Generally, a transmission system for a digital signal comprises a transmitter and a receiver connected by a transfer bus. With reference to FIG. 1 a transmission system of the above type comprising at least one transmitter 1 for a digital signal is schematically represented by reference 20.

In particular, in the example shown in FIG. 1, the transmitter 1 comprises three drivers 1a, 1b, 1c. The transmission system 20 also comprises a receiver 2 for receiving this digital signal, and at least one transfer bus 3 for connection of the transmitter 1 to the receiver 2 and the transmission of the digital signal.

In particular, the transfer bus 3 schematically shown in FIG. 1 is aligned with one or more additional transfer buses 5 and 6, similarly structured and integrated in an integrated circuit 21.

To speed up the transfer of the digital signal from the transmitter 1 to the receiver 2 transmission systems 20 are known to adopt techniques for regulating the ratio RC (Resistance-Capacity) of the transfer bus 3. These techniques suitably vary the resistance of the transfer bus 3, and allow the adjustment of the transfer speed of the digital signal.

Although advantageous, the transmission systems based on RC regulation of the transfer bus are affected by the physiological RC limit of the integration process. For example, considering the use of a transfer bus 3 with length equal to 6 mm, for a process wherein the resistivity of the material making up this transfer bus is 80 mΩ/squared and has an area capacity of 110 fF/u$^2$, there will be an RC limit or asymptotic of about 60 ps.

This estimate is not significant since it implies power being input into a transfer bus 3, and a practically unlimited width of the above transfer bus. In a realistic case the transfer bus 3 has a width of 2 u dedicated to the digital signal to be transmitted, and it produces a measured delay with a voltage equal to half a supply voltage (VCC/2) of 400 ps.

The speed of the digital signal on the transfer bus 3 is also influenced by the transmission of digital signals onto the additional transfer buses 5 and 6, since these additional buses 5 and 6 interfere with the transfer bus 3, causing a slowdown thereof in the propagation of the digital signal.

The International Application No. WO98/40980 discloses an apparatus for an electrical line communication between a transmitter and a receiver. Such an application is intended to transfer high speed data over long distances, using couplers at each of two or more locations along the electrical line.

SUMMARY OF THE INVENTION

An object of the present invention is to provide a transmission system for a digital signal for an integrated circuit having structural and functional characteristics so as to allow a transmission thereof with minimum delay and while overcoming the limits and/or the drawbacks associated with prior art systems, and adjusting the transmission speed of the digital signal without increasing the width of the transfer bus or the power inputting into this transfer bus.

Another object of the invention is to adjust the transfer speed of a digital signal in a transfer bus to improve the global throughput of the whole transmission system, especially in the case of transmission systems based on asynchronous clock signals.

Yet another object of the invention is to accelerating the transmission of the digital signal onto a transfer bus, from a transmitter to a receiver, without increasing the width of the transfer bus and without increasing the power of the transmission driver.

One embodiment of the present invention relates to a transmission system for a digital signal comprising a transmitter, a receiver connected to the transmitter by a transfer bus, and at least one conductive line capacitively coupled to the transfer bus. In this manner the conductive line is able to shield the transfer bus from disturbances linked to the presence of other transfer buses, and to adjust the transmission speed of the digital signal in the bus itself.

BRIEF DESCRIPTION OF THE DRAWINGS

Further features and advantages of the device according to the invention will be apparent from the following description of an embodiment thereof given by way of nonlimiting examples with reference to the annexed drawings.

DETAILED DESCRIPTION OF THE PREFERRED EMBODIMENTS

Figure 2:
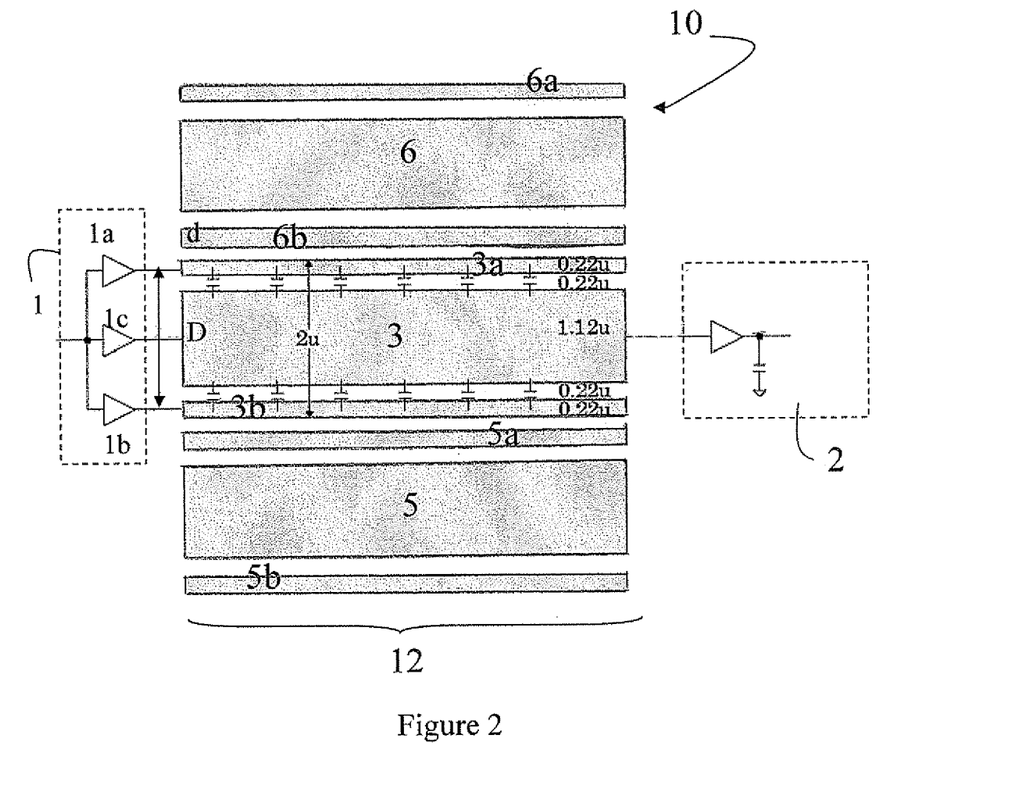
FIG. 2 schematically shows a transmission system for a digital signal comprising a transfer bus according to the present invention.

With reference to FIG. 2 a transmission system for a digital signal according to the present invention is schematically represented by reference 10. Elements in the remaining drawing figures, being structurally and functionally identical with respect to the transmission system described with reference to FIG. 1a will be given the same reference numbers and may not be described in detail in each drawing figure in which they appear.

The transmission system 10 thus comprises a transmitter 1 for a digital signal subdivided, in the example shown in the figure, into three drivers 1a, 1b, and 1c globally having power P, a receiver 2 and a transfer bus 3 for the connection of the transmitter 1 to the receiver 2 and the transport of the digital signal.

In particular, the transmission system 10 is structured for and connected to an integrated circuit 12 comprising the transfer bus 3 realized as a higher metal level with respect to a plurality of circuit elements, and aligned with one or more additional transfer buses 5 and 6 being similarly structured and globally integrated in the integrated circuit 12.

It is not essential that the transfer bus 3 is overlapped onto the plurality of circuit elements. This transfer bus 3 may also be placed on a non-active area of the integrated circuit 12, for example, on field oxide. Moreover, it is possible to consider the case of a transfer bus 3 that is not flanked by additional transfer buses 5 and 6 for its whole length.

The transmission system 10 of the digital signal is characterized in that the transfer bus 3 is coupled on both sides, at the interface with the additional transfer buses 5 and 6, for its whole length or for part thereof, to at least one conductive line 3a, 3b. Advantageously, for conductive lines 3a, 3b, the width d is smaller with respect to a width D of the transfer bus 3 and is placed very close to it but not in contact therewith.

Moreover, to contain the global space of the transmission system as much as possible, in a preferred embodiment the width d is the minimum photolithographically definable in the technology used.

In particular, the conductive line 3a, 3b has a width equal to a fraction of a width of the transfer bus 3 and, globally, the transfer bus 3 and these first and second conductive lines 3a, 3b have a width substantially corresponding to a width of a standard bus.

Advantageously, the transfer bus 3 and each conductive line 3a, 3b is supplied by one of the transmitter drivers. In particular, a first and a second driver 1a, 1b, for the conductive line 3a, 3b, and a third driver 1c for the transfer bus 3. There is global power P and the phase displacement is adjustable in the transmission of the respective digital signals.

Figure 2A:
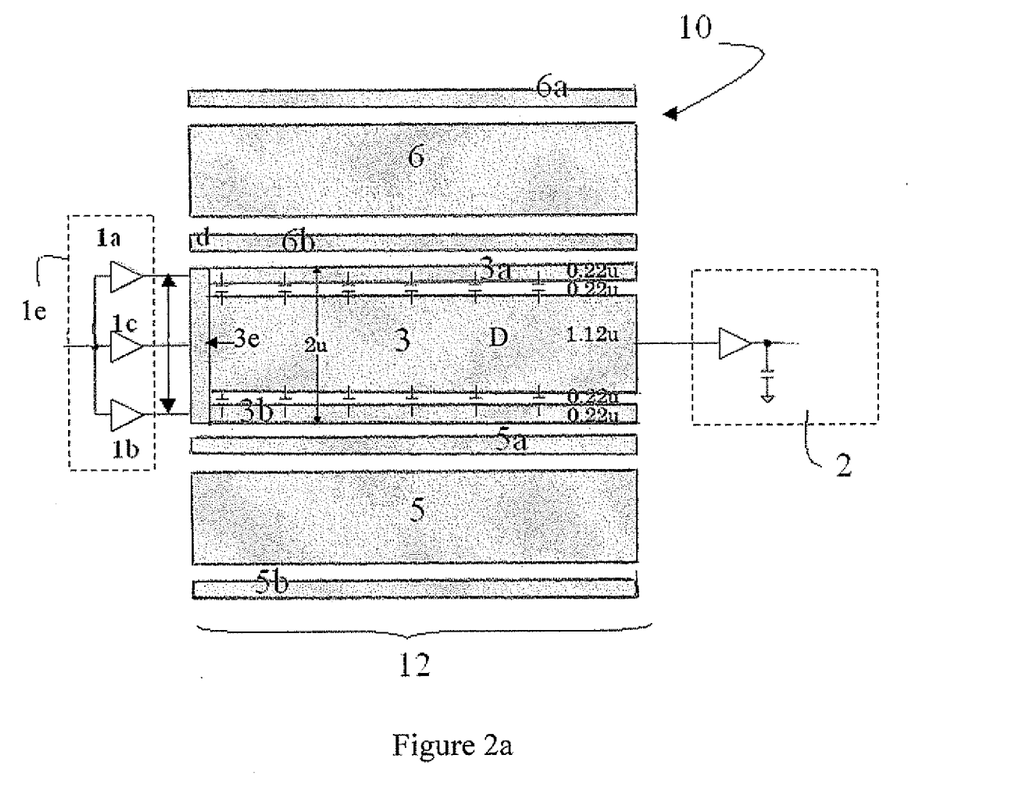
FIG. 2a schematically shows a further embodiment of the transmission system for a digital signal according to the present invention.
Figure 2B:
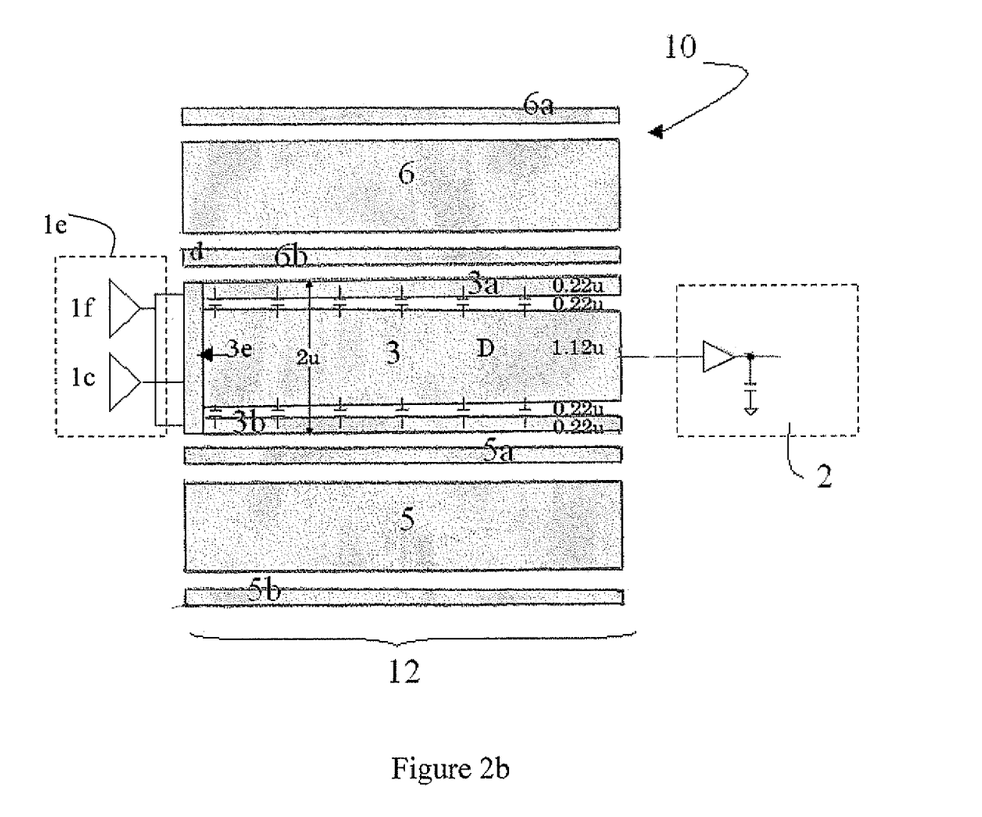
FIG. 2b schematically shows another embodiment of the transmission system for a digital signal according to the present invention.

Advantageously, in a preferred embodiment, the transfer bus 3 is driven by a dedicated driver while the conductive lines 3a and 3b are driven, in parallel, by a single driver 1f which ensures a same phase displacement with respect to the transfer bus 3, as schematically shown in FIG. 2b.

The transfer bus 3 is aligned with the additional transfer buses 5 and 6, in turn coupled, on both sides, with respective conductive lines 5a, 5b and 6a, 6b. The conductive lines 6b and 5a are adjacent to each other, but not in contact with the conductive lines 3a and 3b of the transfer bus 3.

Advantageously, the transmitter 1 comprises a third driver 1c which transmits the digital signal onto the transfer bus 3 separately with respect to the drivers 1a and 1b which transmit the same digital signal respectively onto the conductive lines 3a and 3b. Thus, the effect of the conductive lines 3a and 3b is that of shielding the transfer bus 3 from the disturbances coming from the additional transfer buses 5 and 6 adjacent thereto, which are in turn shielded, through the conductive lines 5a and 6b, from the disturbance coming from the transmission of the digital signal onto the transfer bus 3.

The transmission of the digital signal onto the conductive lines 3a and 3b through the first and second driver 1a and 1b occurs with phase displacement adjustable with respect to the digital signal transmitted by the third driver 1c onto the transfer bus 3 due to the subdivision of the transmitter 1 into the drivers 1a, 1b, 1c.

Advantageously, this phase displacement is adjustable with delay or advance besides this amount. The conductive lines 3a and 3b are capacitively coupled with the transfer bus 3. The capacitive coupling induces an acceleration or deceleration of charge on the conduction line 3.

Advantageously, the effect of the conductive lines 3a and 3b eliminates the disturbance caused by the transmission of the digital signal on the additional transfer buses 5 and 6, speeding up the transmission onto the transfer bus 3. The conductive lines 3a and 3b in fact allow an adjustable acceleration or a slowdown of the digital signal transmitted onto the transfer bus 3.

Advantageously, the conductive lines can be coupled with the transfer bus 3 in parallel with respect to the surface thereof, obtaining a similar acceleration or slowdown effect in the transmission of the digital signal onto the transfer bus 3. In this case, the conductive lines are realized with metal levels being different from the metal level which realizes the transfer bus 3. For example, as schematically shown in FIG. 5, the transfer bus 3 is realized by a level metal X, while the conductive lines 3f and 3g are respectively realized by a higher metal level X+1 and a lower metal level X−1, in a substantially vertical way along the direction of deposition of the layers forming the integrated circuit 12.

In one embodiment, it is also possible to use one single conductive line 3g, realized on the metal layer X-1 underlying the metal layer X which realizes the transfer bus 3, avoiding in this way to engage too many metal levels of the integrated circuit. In this embodiment, the higher metal layer x+1 as illustrated in FIG. 5 would not be necessary since conductive line 3f is not needed. It is immediate to verify that this approach is particularly efficient when the metal layer X which realizes the transfer bus 3 is the last metal layer of the integrated circuit 12. In this way, further undesired capacitive couplings are avoided between the transfer bus 3 and the bonding wires above the integrated circuit 12.

In this case, it is not possible to determine, in the designing step, the distance between these wires and the thickness of the same (characteristics fixed by the technology used). Thus, it is not possible to evaluate, a priori, the capacity of undesired capacitive effects.

Figure 5:
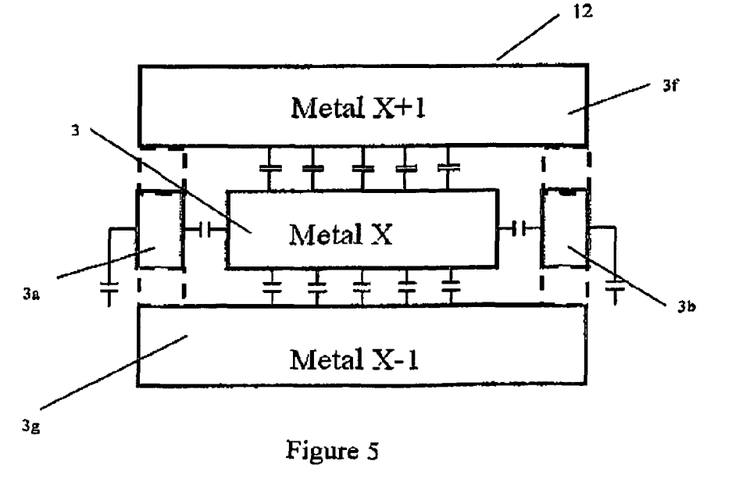
FIG. 5 schematically shows a transmission system for a digital signal comprising a transfer bus capacitively coupled to upper and lower conductive lines.

It is also possible to repeat the capacitive couplings by combining the embodiments shown for the conductive lines, coplanar conductive lines 3a and 3b with vertical conductive lines 3f and 3g to optimize the resulting effect, as shown in FIG. 5. Also in this case, each conductive line is advantageously driven by a corresponding driver, possibly separated and/or with phase displacement adjustable with respect to the driver of the signal on the transfer bus 3.

This parallel coupling of conductive lines with the transfer bus 3 can also be associated with the lateral coupling of the conductive lines 3a and 3b already described, to obtain a further acceleration of the digital signal and to shield the transfer bus 3 from the disturbance coming from the additional transfer buses 5 and 6.

More particularly, the vertical or parallel coupling of conductive lines described above is not to be considered in strictly geometrical terms, but more generally as an alignment of conductive lines intended to realize the capacitive coupling with the transfer bus. For example, the geometrical aspect of the conductive lines could be different, notwithstanding providing a same capacitive coupling with the transfer bus. For example, the geometrical aspect of the conductive lines could be different with respect to the lines represented in figures, notwithstanding providing a same capacitive coupling with the transfer bus.

A further embodiment provides that the transmission of the digital signal onto the conductive lines 3a and 3b and onto the transfer bus 3 is driven by a single driver 1e. These conductive lines and this transfer bus are grouped at the input by an input conductive line 3e as schematically shown in FIG. 2a.

In this case the speed of the digital signal transmitted onto the transfer bus 3 is adjusted through a suitable sizing of the conductive lines 3a and 3b, the latter being capacitively coupled with the transfer bus 3.

In a simulation, a transmission system has been considered wherein the transmitter 1 and the receiver 2 are spaced by 6 mm and the transfer buses are globally spaced by a width equal to 2u of which: 1.12u is dedicated to the transfer bus 3; 0.22u is dedicated to each conductive line 3a and 3b; and 0.22u is dedicated to separating the conductive lines 3a and 3b from the transfer bus 3, as shown in FIGS. 2, 2a and 2b.

When copper is used so that a height of the transfer bus 3 is equal to 240 nm, a transmission time of the digital signal from the transmitter 1 to the receiver 2 is about 225 ps, i.e., about half with respect to the time used by the signal to cross a transfer bus of equal length realized according to the prior art.

Figure 3:
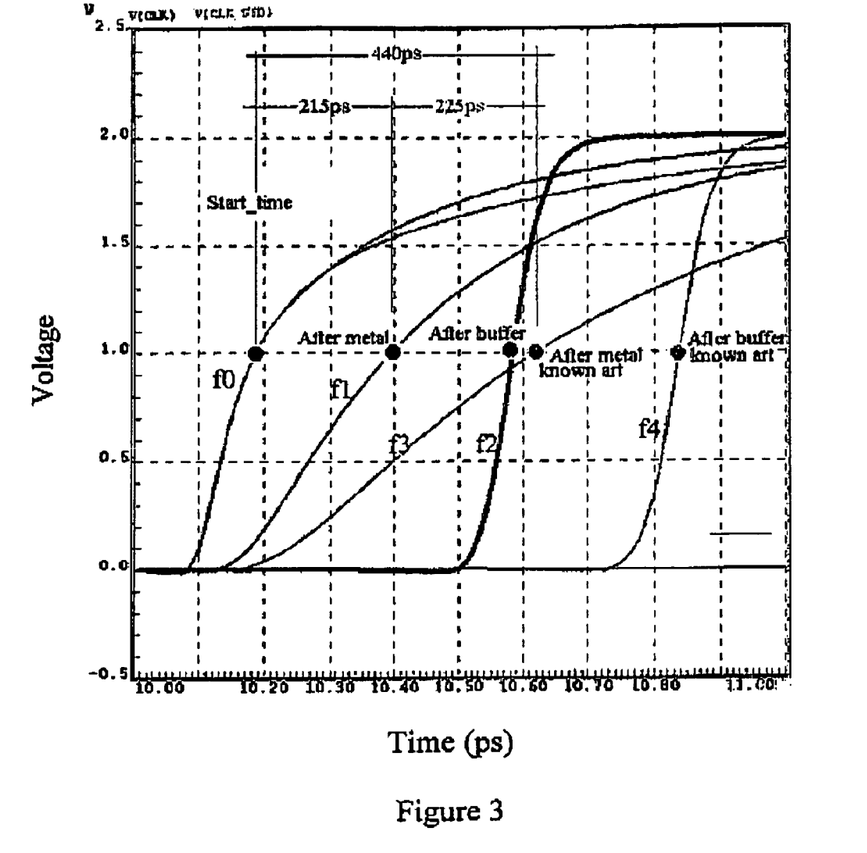
FIG. 3 shows, according to the supply voltage, the buffer time of the digital signal through the transfer bus and through the transmitter respectively in a transmission system according to the present invention and in a transmission system according to the prior art.

In other words, according to the present invention, it is possible to adjust the buffer time compared to the voltage of a digital signal through a transfer bus, by accelerating or delaying this signal. FIG. 3 compares the time evolution during the transmission of a digital signal through the transfer bus 3 according to the invention and according to the prior art indicating, through different curves, respectively f0, f1, f2, f3, and f4.

The curve f0 shows the stimulus signal, i.e., the signal generated by the driver (1, 1c) on the basis of which the starting instant is defined (Start_time) for the calculation (by difference) of the propagation time. The curve f1 corresponds to the propagation of the signal through the bus according to the present invention, the instant (After_metal) indicating the moment (215 ps from Start time) when the signal has propagated up to the other end of the transfer bus 3 (measured before the receiver 2).

The curve f2 corresponds to the evolution of the signal measured at the output of the receiver 2. Thus, a reception time (225 ps from the instant After metal) (After_buffer) is associated therewith by the receiver of the digital signal transmitted by the transfer bus according to the invention. The total time from curve f0 to curve f2 is 440 ps.

The curve f3 corresponds to the propagation of the digital signal through a transfer bus realized according to the prior art. The instant (After_metal known art) indicates the moment when the signal has propagated up to the other end of the transfer bus 3 (measured before the receiver 2).

The curve f4 corresponds to the evolution of the signal measured at the output of the receiver 2. Thus, a reception time (After_metal known art) is associated therewith by the receiver of the digital signal transmitted by the transfer bus according to the prior art.

Figure 4:
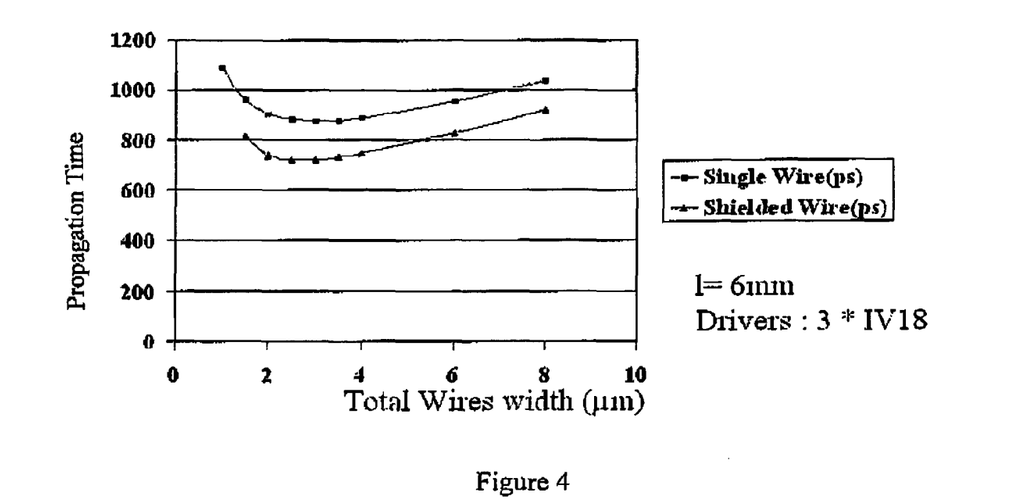
FIG. 4 shows, according to the global width of the transfer bus, the transfer time of the digital signal through the transfer bus respectively in a transmission system according to the present invention and in a transmission system according to the prior art.

FIG. 4 compares the propagation times of the digital signal transmitted onto a standard transfer bus (Single Wire) with the propagation times of the digital signal transmitted onto a transfer bus (Shielded Wire) according to the present invention. More in particular, the diagram of FIG. 4 shows these propagation times according to the global width (Total wire width) of the transfer bus, with its length 1 fixed at 6 mm. The propagation time comprises the time used by the transmitter, in three drivers (3*IV18), to send the signal and the time used by the receiver to receive the signal.

Especially in the case of transmission systems based on asynchronous clock signals, the possibility of adjusting the transfer speed of the digital signal in a transfer bus results in an improvement of the global throughput of the transmission system. Two or more digital signals in fact, transmitted onto corresponding transfer buses, can be adjusted and synchronized at the output with the respective receivers. As a consequence, this eliminates storage of the signals being buffered more quickly with respect to the slower signals.

In conclusion, the transmission signals of a digital signal according to the present invention comprise accelerating the transmission of the digital signal onto a transfer bus, from a transmitter to a receiver, without increasing the width of the transfer bus and without increasing the power of the transmission driver. This bus is coupled with conductive lines, arranged laterally or in parallel to the transfer bus, and suitably dimensioned and/or driven by dedicated transmission drivers.

That which is claimed:

1. A transmission system for a digital signal comprising:
   a transmitter;
   a receiver;
   a transfer bus coupled between said transmitter and said receiver;
   at least one conductive line capacitively coupled to said transfer bus; and
   said transmitter comprising a plurality of drivers, including a driver for said transfer bus and a driver for said at least one conductive line, with each driver being configured to transmit a respective digital signal, and with the digital signal transmitted on said at least one conductive line being used to shield said transfer bus from disturbances.

2. A transmission system according to claim 1 wherein said at least one conductive line has a width less than a width of said transfer bus.

3. A transmission system according to claim 1 wherein said transfer bus is on a first metallic layer, wherein said at least one conductive line comprises a single conductive line on a second metallic layer different from said first metallic layer.

4. A transmission system according to claim 1 wherein said at least one conductive line comprises first and second conductive lines on opposite sides of said transfer bus, and are coplanar therewith.

5. A transmission system according to claim 4 wherein said plurality of drivers respectively comprise first, second and third drivers, wherein said first and second conductive lines are coupled to said first and second drivers respectively, and wherein said transfer bus is coupled to said third driver.

6. A transmission system according to claim 4 said first and second conductive lines are coupled in parallel to the same driver.

7. A transmission system according to claim 1 wherein said at least one conductive line has a width equal to a minimum width photolithographically definable by technology used to form the transmission system.

8. A transmission system according to claim 1 wherein said transfer bus is on a metallic layer, and wherein said at least one conductive line capacitively coupled with said transfer bus is on a different metallic layer.

9. A transmission system according to claim 1 wherein said transfer bus comprises a conducting level higher with respect to a plurality of circuit elements of the transmission system.

10. A transmission system according to claim 1 wherein each driver is configured to transmit their respective digital signal with a corresponding adjustable phase displacement.

11. A transmission system according to claim 10 wherein the respective adjustable phase displacement is such that the digital signal transmitted by said driver coupled to said at least one conductive line is delayed with respect to the digital signal transmitted by said driver coupled to said transfer bus.

12. A transmission system according to claim 1 further comprising at least one input conductive line, and wherein said at least one conductive line and said transfer bus are grouped at an input thereof by said input conductive line.

13. A transmission system according to claim 1 further comprising an integrated transfer bus substantially parallel to said transfer bus, and wherein said at least one conductive line is interposed between said transfer bus and said at least one integrated transfer bus.

14. An integrated circuit comprising:
   a substrate;
   a transmitter on said substrate;
   a receiver on said substrate;
   a transfer bus coupled between said transmitter and said receiver for transporting a digital signal; and
   at least one conductive line capacitively coupled to said transfer bus and having a width equal to a minimum width photolithographically definable by technology used to form the integrated circuit.

15. An integrated circuit according to claim 14 wherein said transmitter comprises a plurality of drivers, and wherein said transfer bus and said at least one conductive line are coupled to a respective driver.

16. An integrated circuit according to claim 14 wherein said at least one conductive line comprises first and second conductive lines on opposite sides of said transfer bus, and are coplanar therewith.

17. An integrated circuit according to claim 16 wherein said transmitter comprises a plurality of drivers, wherein said first and second conductive lines are coupled to first and second drivers respectively, and wherein said transfer bus is coupled to a third driver.

18. An integrated circuit according to claim 14 wherein said at least one conductive line has width less than a width of said transfer bus.

19. A transmission system for digital signals in integrated circuits comprising:
   a transmitter;
   a receiver;
   a transfer bus coupled between said transmitter and said receiver;
   at least one conductive line extending substantially in parallel to said transfer bus and being capacitively coupled thereto; and
   said transmitter comprising a plurality of drivers, including a driver for said transfer bus and a driver for said at least one conductive line, with each driver being configured to transmit a respective digital signal, and with the digital signal transmitted on said at least one conductive line being used to shield said transfer bus from disturbances.

20. A transmission system according to claim 19 wherein said at least one conductive line has a width less than a width of said transfer bus.

21. A transmission system according to claim 19 wherein said at least one conductive line comprises first and second conductive lines on opposite sides of said transfer bus, and are coplanar therewith.

22. A transmission system according to claim 21 wherein said plurality of drivers respectively comprise first, second and third drivers, wherein said first and second conductive lines are coupled to said first and second drivers respectively, and wherein said transfer bus is coupled to said third driver.

23. A transmission system according to claim 21 wherein said first and second conductive lines are coupled in parallel to the same driver.

24. A transmission system according to claim 19 wherein each driver is configured to transmit their respective digital signal with a corresponding adjustable phase displacement.

25. A transmission system according to claim 24 wherein the respective adjustable phase displacement is such that the digital signal transmitted by said driver coupled to said at least one conductive line is delayed with respect to the digital signal transmitted by said driver coupled to said transfer bus.

26. A transmission system according to claim 19 further comprising an integrated transfer bus substantially parallel to said transfer bus, and wherein said at least one conductive line is interposed between said transfer bus and said at least one integrated transfer bus.

* * * * *